United States Patent [19]

Harvey

[11] 4,129,117

[45] Dec. 12, 1978

[54] SOLAR ENERGY COLLECTOR

[75] Inventor: Lawrence Harvey, Coldharbour Nr. Dorking, England

[73] Assignee: The British Petroleum Company Limited, London, England

[21] Appl. No.: 678,958

[22] Filed: Apr. 21, 1976

[30] Foreign Application Priority Data

Apr. 21, 1975 [GB] United Kingdom ............... 16349/75

[51] Int. Cl.² .............................................. F24J 3/02
[52] U.S. Cl. .................................... 126/271; 126/270
[58] Field of Search ............... 126/270, 271; 237/1 A; 165/171, 172, 173, 175, 176

[56] References Cited

U.S. PATENT DOCUMENTS

| 2,680,437 | 6/1954 | Miller | 126/270 |
|---|---|---|---|
| 3,064,418 | 11/1962 | Sanders | 126/270 |
| 3,102,532 | 9/1963 | Shoemaker | 126/271 |
| 3,239,000 | 3/1966 | Meagher | 126/271 |
| 3,951,129 | 4/1976 | Brantley, Jr. | 126/271 |
| 3,981,294 | 9/1976 | Deminet et al. | 126/271 |
| 4,030,477 | 6/1977 | Smith | 126/271 |

FOREIGN PATENT DOCUMENTS

| 2604684 | 2/1976 | Fed. Rep. of Germany | 126/270 |
|---|---|---|---|
| 472427 | 1/1952 | Italy | 126/271 |

Primary Examiner—Kenneth W. Sprague
Assistant Examiner—James C. Yeung
Attorney, Agent, or Firm—Brooks, Haidt, Haffner & Delahunty

[57] ABSTRACT

A solar energy collector comprising a transparent container containing a particulate or fibrous radiation absorbing material and having a transparent outer cover through which a heat conveying fluid can pass before passing through the container.

17 Claims, 8 Drawing Figures

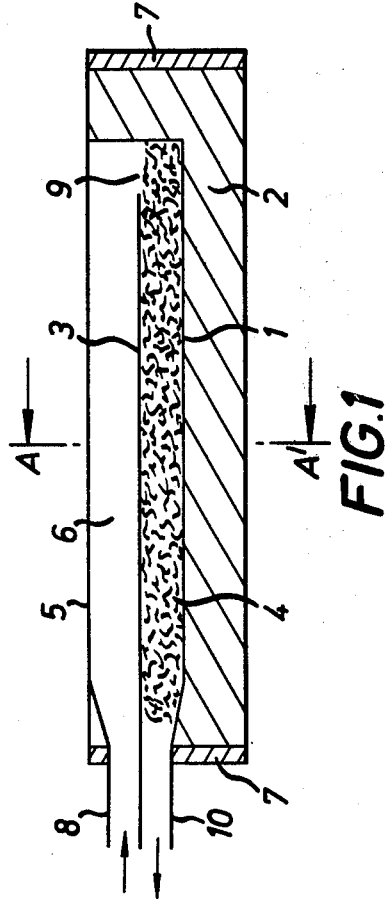
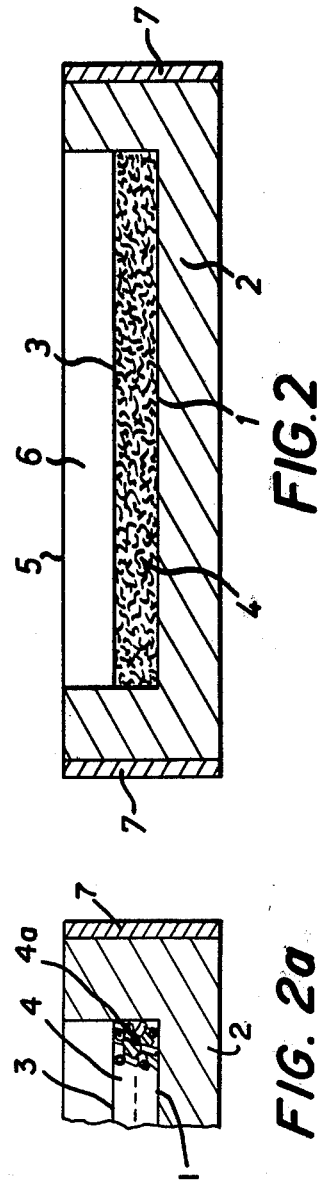
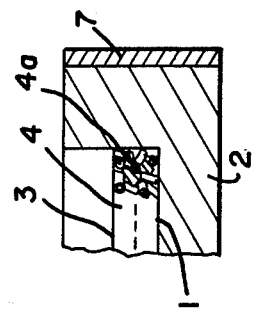

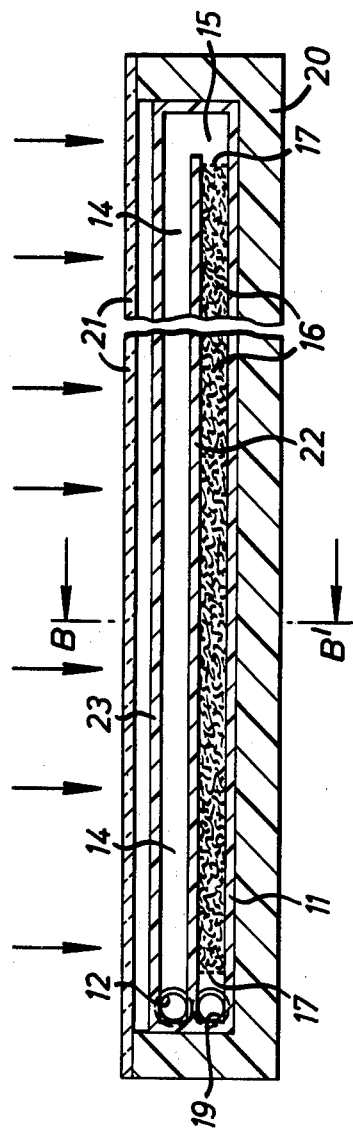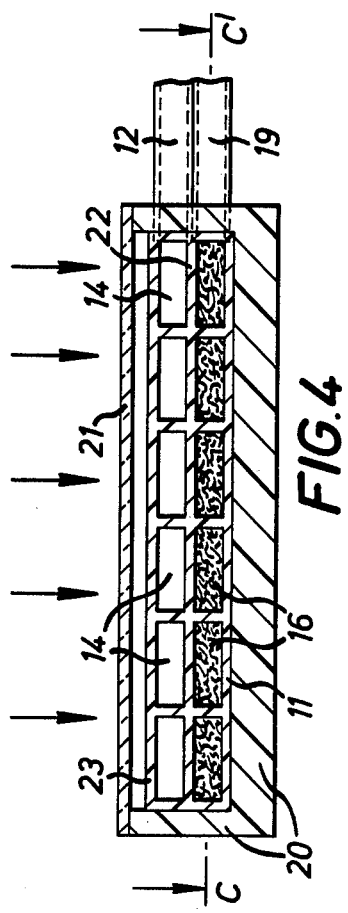

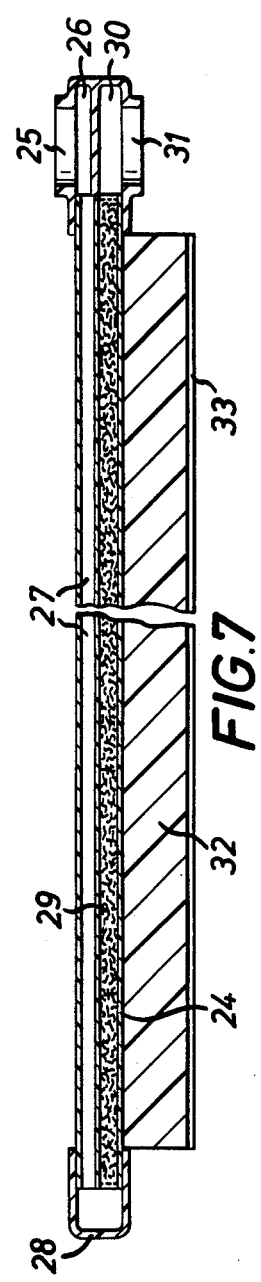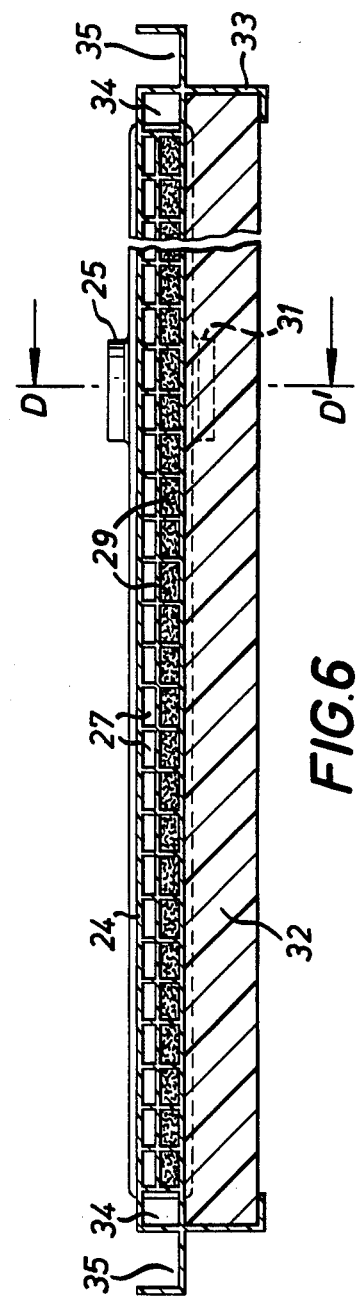

SOLAR ENERGY COLLECTOR

The present invention relates to solar radiation collectors.

Solar collectors for thermal conversion fall into two main categories:

1. Collectors for high temperature conversion, the sun's rays being concentrated by concave reflectors which track the sun during the day. This type of collector cannot be used effectively in diffuse light.

2. The fixed "flat-plate" collectors which will convert direct or diffuse sunlight into heat, for temperatures below 200° C.

Typically a "flat-plate" collector of a type which has been used successfully in countries such as Israel and Japan comprises a circular metal tube bonded to a metal plate which is mounted on an insulated surface. Heat absorbed by the plate passes into the heat collecting fluid that is arranged to pass through the metal tubing. To improve efficiency the collector is normally placed in a sealed box having a transparent cover which suitably is made with double glazing. Such units can have an efficiency of about 40% at 50° C.

For this type of collector to be of use in higher latitudes, where the angle of incidence of the solar radiation is lower, particularly during winter months, the conversion efficiency has to be much improved.

My copending U.S. application Ser. No. 622,982, filed Oct. 16, 1975, now abandoned, discloses a solar collector comprising a transparent heat collecting zone and energy absorbent particles or fibres having a density not greater than 1.1 present in said zone.

An object of the present invention is to provide an improved solar energy collector.

Accordingly the present invention provides a solar energy collector comprising a heat collecting zone containing energy absorbent particulate or fibrous material and having a first transparent wall through which solar energy can pass, a second transparent wall mounted adjacent to the first wall so as to form a transparent flow path zone through which the radiation passes before entering the collecting zone, and inlets to and outlets from the collecting zone and the flow path zone for heat conveying fluid, the outlet from the flow path zone being connected to the inlet of the collecting zone.

The heat collecting zone is suitably comprised by a hollow container equipped with one or more inlets and outlets to enable the heat conveying fluid to flow through the container. The container can have any desired shape but preferably has a flat box shape. The container may be formed entirely from a transparent material, for example lay-flat plastic tubing, but it is preferred to make transparent only the wall adapted to receive the incident sunlight, the other walls preferably being made black on the inner surface and reflective on the outer surface and/or being heat insulated on the outside. The transparent material employed is preferably transparent to as large a proportion of the solar spectrum, including infra-red, visible and ultra-violet radiation as possible and should not soften at temperatures likely to be encountered in the operation of the collector. Suitable transparent materials include glass, polymethyl methacrylate, cellulose, acetate, polyethylene, polystyrene, polycarbonate, clear P.V.C. and mica. Plastics material such as P.V.C. and polycarbonate are especially suitable, as they have low thermal conductivity. The use of polycarbonate is preferred.

The second transparent wall may be made from any of the materials suggested above for the transparent heat collecting zone wall, but preferably from the same material. It is positioned in the collector adjacent to the transparent heat collecting zone wall so as to define a flow path zone for the heat conveying fluid leading to the collecting zone, through which the radiation passes before it enters the collecting zone. Preferably the second wall extends over substantially the whole of that part of the collecting zone which is designed to receive solar radiation. Thus it forms a flow path zone for the heat conveying fluid over this area. The second wall is normally parallel to the transparent wall of the heat collecting zone in the direction of flow, thus forming a flow path zone of uniform width in which the heat conveying fluid will move with uniform velocity. Alternatively, the distance between the two walls can be varied in the direction of flow, with a corresponding variation in the volume of the flow path zone and the velocity of the heat conveying fluid. Preferably the dimensions of the flow path zone are uniform in the directions transverse to the direction of flow. Suitably the volume is arranged to be approximately the same as that of the collecting zone, but it may be many times larger or smaller depending on the flow rates it is desired to use. For most types of collector the two walls are suitably separated by about 1/16 to ½ inch.

In a particularly preferred embodiment one or both of the transparent flow path zone and the heat collecting zone comprise an integrally formed strip of parallel transparent tubes. Each strip of tubes is preferably formed as a layer of tubes lying adjacent to one another wherein the longitudinal axes of the tubes are coplanar. The tubes preferably have a square or rectangular cross-section, two opposite sides of each tube forming top and bottom surfaces of the strip and each of the other opposite sides forming a common side with an adjacent tube except at the longitudinal edge of the strip where the edge tubes have only one side common with an adjacent tube. In one preferred embodiment the transparent flow path zone and the heat collecting zone are formed integrally as a double layer of parallel transparent tubes in which the top surface of each tube in the lower layer forms a common side with an adjacent tube in the upper layer. The upper layer of tubes collectively form the flow path zone, while the lower layer of tubes collectively form the collecting zone. The outlet from the flow path zone can be connected to the inlet of the collecting zone by a manifold section. Likewise the inlet to the transparent flow path zone and the outlet from the heat collecting zone both suitably consist of an inlet pipe and a manifold. The tubes are preferably formed by extrusion or blow-moulding. In another embodiment the flow path zone is formed from a single layer of integrally formed parallel transparent tubes in the lower part of each of which is positioned an internal tube containing the energy absorbent particulate or fibrous material, the internal tubes collectively forming the heat collecting zone. The internal tubes are connected together at either end by suitable manifold pieces.

The heat collecting zone may be made from a different material to the transparent wall forming the flow path zone. For instance the latter wall may be constructed of polycarbonate, and the heat collecting zone formed of other material having superior stress properties in contact with hot water, for instance PVC, polyvinylidene chloride, clear high density polyethylene, clear acrylonitrile/butadiene/styrene resin, methyl methacrylate/butadiene/styrene resin, or Barex resin.

The energy absorbent particulate or fibrous material contained in the heat collecting zone of the present invention is suitably made from any material capable of effectively absorbing solar radiation. The density of the particles or fibres is preferably not greater than 1.1, and most preferably in the range 0.9 to 1.0. Preferred materials from which the particles or fibres are made are carbon, for example carbon or graphite pellets or carbon fibres; carbon filled plastics or rubber, for example carbon filled polyethylene pellets or fibre or granulated scrap motor car tyres; blackened expanded perlite particles; bitumen or modified bitumen chippings; chemically blackened metal wool or metal particles; and black glass particles or dark flint chippings. Materials having high solar energy absorption and low thermal diffusivity (e.g. preferably below $2.5 \times 10^{-3}$ cms$^2$/sec at temperatures above 20° C.), for example carbon filled high density polyethylene, are particularly preferred.

Where the energy absorbent material is particulate the particles can be for example discrete granules, pellets, beads tubelets or chippings, or a porous sintered mass of the particles. Cylindrical hollow pellets or tubelets are preferred. The particles preferably have a mean particle diameter in the range 1 to 10 millimeters, more preferably 3.0 to 4.0 mm. The particles preferably substantially fill the heat collecting zone but are loosely packed so that when a liquid is passed through they are not entirely static but are free to move to a limited extent within the confines of the heat collecting zone. The energy absorbent particulate or fibrous material is confined to the heat collecting zone by an outlet through which the heat conveying fluid, but not the particulate or fibrous material, can pass.

The heat conveying fluid must be wholly or partially transparent to solar energy and can be a liquid or a gas, examples of suitable fluids being water, water/antifreeze mixtures, alcohols such as glycerine, oil air, carbon dioxide, or high aliphatic hydrocarbons. Good results are obtained using water as the heat conveying fluid. The heat conveying fluid should be chosen to be compatible with the material of construction of the solar energy collector. Thus methanol would not be suitable for use in a collector constructed from polycarbonate.

There is a reduction in energy losses in collectors according to the present invention, due to reduced re-radiation and conduction of energy from the collector, energy losses from the collecting zone by radiation and conduction being recovered by absorption in the flow path zone. Because the incoming heat conveying fluid in the flow path zone is comparatively cold, radiation and conduction from the collector to the environment is reduced.

In operation a heat conveying fluid is passed through the energy collector. The fluid first enters the flow path zone defined by the two transparent walls and passes from the flow path zone into the heat collecting zone. It is heated by the solar energy in the collecting zone and then passes from the collector through the outlet therefrom. The inlet and outlet pipes may be connected to, for example, a heat exchanger in a hot water storage tank, or if water is used as the heat conveying fluid they may be connected directly to the tank. The fluid may be circulated, for example either by arranging the system so that the fluid heated by the solar radiation thermally syphons into the tank or by employing a low power pump. Alternatively, water may be gravity fed to the collector and thence piped to, e.g. a storage tank.

If the heat conveying fluid is a low boiling liquid, it can be allowed to vapourise in the heat collecting zone and heat will be absorbed as latent heat of vapourisation. The vapour can be allowed to pass to a heat exchanger acting as a condenser for the vapour and be made to give up its latent heat. For example, this heat can be used to pre-heat cold water flowing into hot water tanks. The condensed vapour is then returned to the solar collector.

If desired, several solar radiation collectors can be linked together in series and/or in parallel. The collectors can also be manufactured to form interlocking sheets which can be used to cover a roof. Such systems can provide hot water, for example for domestic use or heating a swimming pool, for process hot water in industry, or for heating air for space heating or drying applications.

As is conventional with solar radiation collectors, those of the present invention can be fitted with "double glazing", i.e. a further transparent sheet is mounted above the second transparent wall and the whole unit is sealed to prevent free access of air to the outer surface of the second transparent wall. This can reduce heat loss to the atmosphere through the wall but it will be appreciated that with collectors according to the present invention the need to prevent this loss of heat energy is reduced because of the heat conserving effect of the relatively cool heat conveying fluid passing through the flow path zone.

The accompanying diagrammatic drawings FIGS. 1 to 5 illustrate two solar radiation collectors according to the present invention.

FIG. 1 represents a vertical cross-section through one collector, and

FIG. 2 represents a vertical cross-section through the same collector in a direction at right angles through the line A-A$^1$ in FIG. 1.

FIG. 2a is similar to FIG. 2 but shows cylindrical hollow pellets as the energy absorbent material.

FIG. 3 represents a vertical cross-section through a second collector according to the present invention, and FIG. 4 represents a vertical cross-section through the same collector in a direction at right angles through the line B-B$^1$ in FIG. 3.

FIG. 6 represents a vertical cross-section through a third collector according to the present invention, and FIG. 7 represents a vertical cross-section through the same collector in a direction at right angles through the line D-D$^1$ in FIG. 6.

Figure 5:
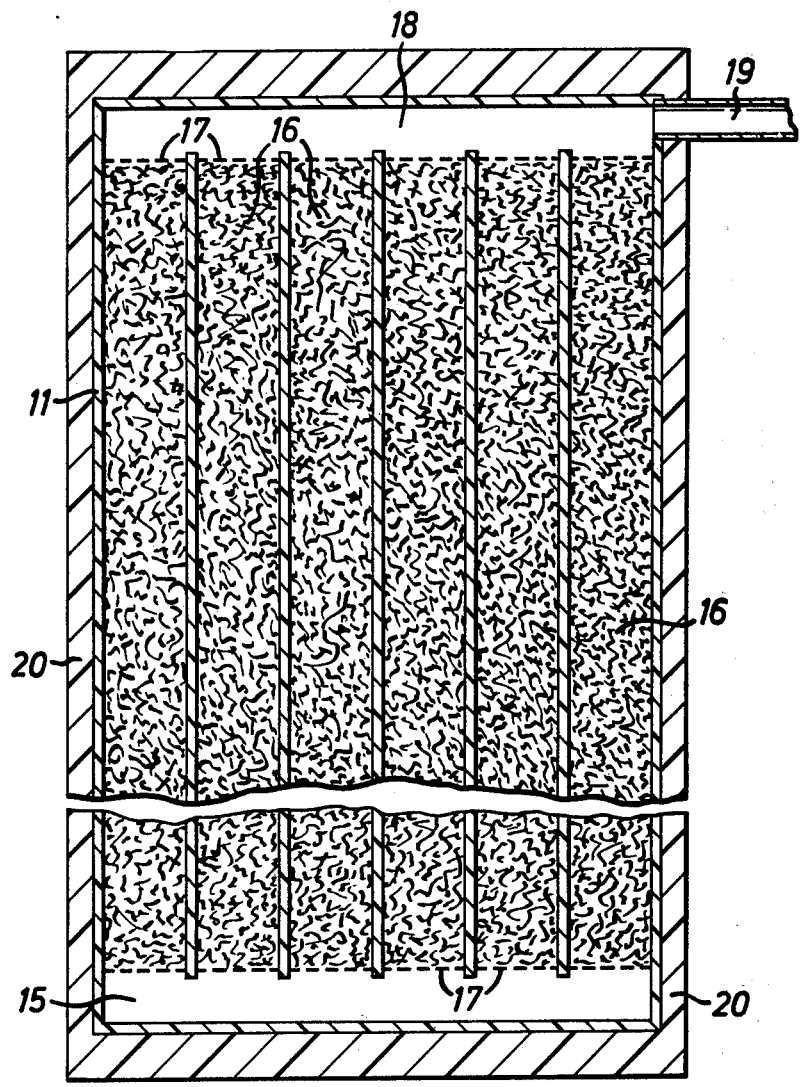
FIG. 5 represents a horizontal cross-section through the line C-C$^1$ in FIG. 4.

Referring to FIGS. 1 and 2 the collector is formed by a flay tray 1 mounted on an insulated base 2 and covered by a transparent wall 3 to form a heat collecting zone 4 which is filled with a fibrous mat made from polyethylene filled with 2% of carbon black. Above the transparent wall 3 a second transparent wall 5 is mounted to form a flow path zone 6. The tray and walls are sealed together to make a fluid tight system and the whole unit is mounted in a frame 7. In operation fresh and relatively cool heat conveying fluid passes into the unit through inlet 8 and moves across the flow path zone 6 and passes into the collecting zone through inlet 9. It then passes through the collecting zone removing heat energy that has been absorbed on the black fibrous mat material. Finally it leaves the unit through outlet 10 and passes to a heat storage unit or heat exchange unit.

FIG. 2a shows cylindrical hollow pellets 4a which may be used in place of the fibrous mat shown in FIGS. 1 and 2.

Referring to FIGS. 3-5, the solar collector comprises an integrally formed strip, 11, extruded from a transparent thermoplastic and comprising twelve parallel tubes arranged in two layers of six tubes, each having a rectangular cross-section. At one end of the strip 11 is an inlet pipe 12 connected by an inlet manifold 13 to the upper layer of six tubes, which collectively form the flow zone 14 defined by a first transparent wall 22 common to both zones and a second transparent wall 23. At the other end of the strip a connecting manifold 15 connects the flow path zone to the lower layer of six tubes, which collectively form the heat collecting zone 16. The heat collecting zone 16 is loosely packed with carbon black filled high density polyethylene fibres held in place by perforated strips 17. At the same end of this strip as the inlet pipe 12, an outlet manifold 18 connects the tubes of the heat collecting zone to the outlet pipe 19. The solar collector is backed by foamed thermoplastic 20 to minimise heat losses from the under surface. A transparent sheet of thermoplastic 21 provides insulation to the side adapted to receive solar radiation. In operation fresh and relatively cool heat conveying fluid passes into the solar collector through inlet pipe 12 and manifold 13, through the flow path zone 14, and into the heat collecting zone 16 via connecting manifold 15. In the heat collecting zone the heat conveying fluid removes heat energy that has been absorbed in the black mat of polyethylene fibres. The heat conveying fluid leaves the solar collector via outlet manifold 18 and outlet pipe 19.

The integrally formed strip 11 may also be made by blow-moulding for instance from polycarbonate resin and may comprise any number of parallel tubes in two layers.

Referring to FIGS. 6 and 7, the solar collector comprises an integrally formed strip 24 extruded from polycarbonate resin and having a number of parallel tubes arranged in two layers each having a rectangular cross-section. At one end of the strip 24 in a central position is an inlet pipe 25 connected by an inlet manifold 26 to the upper layer of tubes, which collectively form the flow path zone 27. At the other end of the strip 24 a connecting manifold 28 connects the upper layer of tubes with the lower layer of tubes which collectively form the heat collecting zone 29. The heat collecting zone 29 is loosely packed with carbon black filled high density polyethylene fibres. At the same end of the strip 24 as the inlet pipe 25, an outlet manifold 30 connects the tubes of the heat collecting zone to the outlet pipe 31. A layer of foamed thermoplastic 32 held in place by the skirt 33 provides insulation for the under surface of the solar collector. On either side of the strip 24 the outer most rectangular tube 34 provides insulation at the edges and does not form part of the heat collecting zone 29. At each edge an integrally formed gutter 35 is provided to allow drainage of rain water. Panels of the type shown in FIGS. 6 and 7 can be laid side by side and linked together at the gutter edges by U-shaped pieces so as to cover part or all of a roof surface.

I claim:

1. A solar energy collector comprising means including a pair of solar energy transparent walls in spaced, side-by-side relation and defining between said walls a first fluid passageway for the passage of fluid therebetween and in contact with said walls, said passageway having an inlet and an outlet spaced from said inlet and being free of solar energy obstructing material so that in the absence of said fluid, solar energy passing through one of said walls is permitted to traverse said passageway and pass through the other of said walls; means including a third wall in spaced, and side-by-side relation with said other of said walls and defining, between said third wall and said other wall, a second fluid passageway for the passage of said fluid which is disposed in the path of solar energy which passes through said pair of walls, said second passageway having an inlet connected to said outlet of first passageway and having an outlet spaced from said last-mentioned inlet, whereby fluid supplied to said inlet of said first passageway flows therealong to said outlet of said first passageway and in the path of the solar energy and then flows from said inlet of said second passageway to the outlet of the latter; solar energy absorbent particulate or fibrous material disposed in said second passageway for absorbing solar energy which passes through said pair of walls, said material being permeable by and in the path of fluid flow in said second passageway, whereby said fluid contacts said material and absorbs heat therefrom; and means for restraining said material from flowing out of said second passageway.

2. A solar energy collector as set forth in claim 1 wherein said pair of walls and said third wall are flat and in substantially parallel relation.

3. A solar energy collector as set forth in claim 1 wherein said third wall is black on its surface facing said second passageway and the surface facing away from said passageway has heat conserving means.

4. A solar energy collector as set forth in claim 3 wherein said heat conserving means is a solar energy reflector.

5. A solar energy collector as set forth in claim 3 wherein said heat conserving means comprises heat insulating material.

6. A solar energy collector as set forth in claim 1 wherein said one wall is co-extensive with said heat absorbent material.

7. A solar energy collector as set forth in claim 1 wherein said first-mentioned means and said second-mentioned means are an integral pair of tubes having a common wall which is said one of said pair of walls.

8. A solar energy collector as set forth in claim 1 further comprising partition means in at least one of said passageways and extending between the inlet and outlet thereof, said partition means sub-dividing said one passageway into a plurality of sub-passageways.

9. A solar energy collector as set forth in claim 1 wherein one of said pair of walls and at least one of the other of said pair of walls and said third wall are formed by a plurality of parallel tubes each integral with the tube adjacent thereto.

10. A solar energy collector as set forth in claim 9 wherein each tube has a rectangular cross-section.

11. A solar energy collector as set forth in claim 1 wherein said material has a density not greater than 1.1.

12. A solar energy collector as set forth in claim 11 wherein the density of said material is in the range from 0.9 to 1.0.

13. A solar energy collector comprising means including a first solar energy transparent wall; a third wall spaced from said first wall; a second energy transparent wall intermediate and spaced from said first wall and said third wall, each wall being substantially parallel to each adjacent wall; partition means extending between said first wall and said second wall and between said second wall and said third wall and forming a plurality of first fluid passageways between said first wall and said second wall and a plurality of second fluid passageways between said second wall and said third wall, each first passageway having a wall in common with a second passageway; inlet means for supplying fluid to one end of each first passageway; outlet means interconnecting the opposite end of each of said first passageways to the adjacent end of each of said second passageways; means for removing fluid from the end of each of said second passageways which is opposite from the end thereof connected to said first passageways, whereby fluid supplied to said one end of each of said first passageways flows therealong in contact with said first wall and said second wall to said opposite end thereof and then flows from said adjacent end of each of said second passageways to said opposite end thereof; solar energy absorbent particulate or fibrous material disposed in said second passageways for absorbing solar energy which passes through said first wall and said second wall, said material being permeable by and in the path of the fluid flow in said second passageways, whereby said fluid contacts said material and absorbs heat therefrom; and means for restraining said material from flowing out of said second passageways.

14. A solar energy collector as set forth in claim 13 wherein said outlet means comprises a manifold.

15. A solar energy collector as set forth in claim 13 wherein each said wall and said partition means are made of the same material and are integral with each other.

16. A solar energy collector as set forth in claim 15 wherein said material of each said wall and said partition means is a polycarbonate resin.

17. A solar energy collector comprising means including a pair of solar energy transparent walls in spaced, side-by-side relation and defining between said walls a first fluid passageway for the passage of fluid therebetween and in contact with said walls, said passageway having an inlet and an outlet spaced from said inlet; means including a third wall in spaced, and side-by-side relation with one of said walls and defining, between said third wall and said one wall, a second fluid passageway for the passage of said fluid which is disposed in the path of solar energy which passes through said pair of walls, said second passageway having an inlet connected to said outlet of said first passageway and having an outlet spaced from said last-mentioned inlet, whereby fluid supplied to said inlet of said first passageway flows therealong to said outlet of said first passageway and in the path of the solar energy and then flows from said inlet of said second passageway to the outlet of the letter; cylindrical hollow pellets or tubulets of solar energy absorbent material disposed in said second passageway for absorbing solar energy which passes through said pair of walls, said pellets or tubulets being permeable by and in the path of the fluid flow in said second passageway, whereby said fluid contacts said pellets or tubulets and absorbs heat therefrom; and means for restraining said pellets or tubulets from flowing out of said second passageway.

* * * * *